(12) United States Patent
Hwang (10) Patent No.: US 8,061,120 B2
(45) Date of Patent: Nov. 22, 2011

(54) CATALYTIC EGR OXIDIZER FOR IC ENGINES AND GAS TURBINES

(76) Inventor: Herng Shinn Hwang, Livingston, NJ (US)

( * ) Notice: Subject to any disclaimer, the term of this patent is extended or adjusted under 35 U.S.C. 154(b) by 627 days.

(21) Appl. No.: 12/217,058

(22) Filed: Jul. 1, 2008

(65) Prior Publication Data

US 2009/0035192 A1 Feb. 5, 2009

Related U.S. Application Data

(60) Provisional application No. 60/962,588, filed on Jul. 30, 2007.

(51) Int. Cl.
F02B 27/04 (2006.01)
(52) U.S. Cl. ............... 60/273; 60/274; 95/279; 423/650
(58) Field of Classification Search ............... 60/273, 60/274, 689; 95/279; 423/650
See application file for complete search history.

(56) References Cited

U.S. PATENT DOCUMENTS

| | | | |
|---|---|---|---|
| 3,975,900 A | 8/1976 | Pfefferle | |
| 4,109,461 A * | 8/1978 | Fujitani et al. ................ | 60/274 |
| 4,522,894 A | 6/1985 | Hwang et al. | |
| 4,844,837 A | 7/1989 | Heck et al. | |
| 5,235,804 A | 8/1993 | Colket et al. | |
| 5,326,253 A | 7/1994 | Dalla Betta et al. | |
| 5,425,332 A | 6/1995 | Rabinovich et al. | |
| 5,794,601 A | 8/1998 | Pantone | |
| 5,947,063 A | 9/1999 | Smith et al. | |
| 6,254,807 B1 | 7/2001 | Schmidt et al. | |
| 6,358,040 B1 | 3/2002 | Pfefferle et al. | |
| 6,415,775 B1 | 7/2002 | Lahti et al. | |
| 6,436,363 B1 | 8/2002 | Hwang et al. | |
| 6,655,130 B1 * | 12/2003 | Kirwan et al. ................ | 60/284 |
| 6,849,572 B2 | 2/2005 | Hwang et al. | |
| 6,895,746 B2 * | 5/2005 | Buglass et al. ................ | 60/286 |
| 6,960,840 B2 | 11/2005 | Willis et al. | |
| 6,964,156 B2 * | 11/2005 | Liu et al. ................ | 60/274 |
| 6,977,067 B2 | 12/2005 | Hwang et al. | |
| 7,028,644 B2 | 4/2006 | Cohn et al. | |
| 7,082,753 B2 * | 8/2006 | Dalla Betta et al. ............ | 60/286 |
| 7,101,531 B2 * | 9/2006 | Kamijo ................ | 423/650 |
| 7,255,848 B2 | 8/2007 | Deluga et al. | |
| 7,262,334 B2 | 8/2007 | Schmidt et al. | |
| 7,610,752 B2 * | 11/2009 | Dalla Betta et al. ............ | 60/286 |
| 7,810,315 B2 * | 10/2010 | Yan ................ | 60/286 |

(Continued)

OTHER PUBLICATIONS

Hwang, H.S. et al., AiChe Annual Meeting, Los Angels Ca. Nov. 15, 2000.

(Continued)

*Primary Examiner* — Wayne Langel (57) ABSTRACT

By using catalytic partial oxidation or autothermal reforming process, a catalytic oxidizer installed in the engine's Exhaust Gas Recycle (EGR) line can be used to produce from fossil fuels or bio-fuels a reformate gas containing $H_2$ and CO for an IC engine or a gas turbine. Thus, a system consisting of an EGR Oxidizer and an IC engine/gas turbine can be used by itself as a driving device, or can be combined with an electric generator and a battery bank to produce, store and transmit electricity to be used in stationary or mobile power generation, transportation and utility etc.

The Oxidizer can also be used to provide reducing gases to regenerate the $NO_x$ or diesel particulate traps, so that the traps can continuously be used for reducing emissions from IC engine, diesel truck, gas turbine, power plant etc.

37 Claims, 5 Drawing Sheets

U.S. PATENT DOCUMENTS

| | | | |
|---|---|---|---|
| 7,900,441 B2 * | 3/2011 | Mital et al. | 60/286 |
| 2007/0275278 A1 | 11/2007 | Hwang | |
| 2008/0032245 A1 | 2/2008 | Bushnell et al. | |
| 2011/0023453 A1 * | 2/2011 | Lucka et al. | 60/273 |
| 2011/0041815 A1 * | 2/2011 | Henriksson et al. | 123/564 |
| 2011/0067382 A1 * | 3/2011 | Federle | 60/274 |

OTHER PUBLICATIONS

Bromberg, L. et al., Diesel Engine Emission Workshop, Newport, RI Aug. 24-28, 2003.
Deluga, G.A. et al., Science vol. 303, P993, 2004.
Salge, J.R. et al., Science vol. 314, P801, 2006.

* cited by examiner

CATALYTIC EGR OXIDIZER FOR IC ENGINES AND GAS TURBINES

CROSS REFERENCE INFORMATION

This application claims benefit to and priority of U.S. Provisional Application No. 60/962,588 filed on Jul. 30, 2007, herein incorporated by reference in its entirety.

BACKGROUND OF THE INVENTION

Internal Combustion Engines and Gas Turbines:

In the 20th century, various types of internal combustion (IC) engines and gas turbines have successfully been developed and been widely used over the years in the stationary power generation, transportation and utility applications. For example, the 2-stroke and 4-stroke engines are used for motorcycle, chainsaw, lawn mower, weed eater, automobile, small power generator etc, the diesel engines are used for truck, bus, stationary power generator etc, and the gas turbines are used for airplanes, power generators etc. Currently, most of the IC engines and gas turbines utilize homogeneous flame combustion of various hydrocarbons (HC) to generate power, and it is known that the timing of ignition, the composition of the fuel/air mixture, the vaporization of the fuels, and the temperature and pressure at the ignition point are very important for a complete combustion. However, despite all the necessary controls and the technology advances over the years, any internal combustion engine or gas turbine will still emit pollutants such as unburned hydrocarbons, CO, $NO_x$, diesel particulates etc.

To reduce the HC, CO, $NO_x$ and diesel particulate pollutants from the internal combustion engine's exhaust gas, catalytic converters and/or diesel particulate traps containing supported Pt group metal catalyst have successfully been used commercially for several decades. However, for this pollution removing technology, it is necessary to use an on-board computer as well as various electronic/mechanical devices to reduce the pollutants by controlling precisely the ignition timing, and the air/fuel ratio of the combustion gas. Also, these devices are required to improve the efficiency of the catalytic converters or traps, which are installed in the engine's exhaust pipe lines.

Various other types of IC engines have also been developed successfully in recent years, and these engines can use different fuels such as hydrogen, natural gas, liquefied propane gas, gasoline/ethanol mixture (flex fuel), diesel/bio-diesel mixture etc.

Catalytic Combustion Technology:

Since 1970's, extensive research and development on catalytic combustion technologies have been studied over the years. As demonstrated in U.S. Pat. Nos. 3,975,900, 5,235,804, 5,326,253 and 6,358,040, herein incorporated by references, the catalytic combustion of HC over the supported Pd and other catalysts using various type of reactor designs can reduce the reaction's peak temperature and, thus, can reduce the formation of $NO_x$, while achieving low CO and HC emissions. However, the reaction peak temperatures are frequently found to be exceeding the upper limits of the catalyst, and they would shorten the catalyst life and cause failures during the applications.

In U.S. Pat. No. 6,960,840 to Willis et al, herein incorporated by reference, two catalytic reactors are used with a gas turbine generator to achieve better exhaust emission. Air and natural gas are first compressed and heat exchanged and a primary catalytic reactor is used to raise the turbine's inlet temperature. After the turbine, a second low-pressure catalytic reactor is used to combust the remaining fuels and to recover the heat. But for this primarily catalytic reactor system, water (or steam), $CO_2$ or the recycle exhaust gas are not used in the feed gas to absorb the reaction heats as well as to perform steam reforming and water gas shift reactions. Furthermore, since no precise control of $O_2/C$ ratio is described, a sudden momentary increase in $O_2/C$ ratio of the feed mixture can cause the run away oxidation reactions over the Pt group metal catalysts, and produce within a few milliseconds excess reaction heats. These heats can permanently deactivate or even melt and destroy the catalysts, and thus reduce the reactor's reliability and its useful life.

Fuel Reforming and Fuel Cells

Fuel cell technologies offer promise and potential as a more efficient, cleaner and quieter process for generating electricity. Therefore, devices using more efficient fuel cell technologies can potentially be used to replace the internal combustion engines for the applications in stationary or mobile power generation, utility and transportation.

However, despite the technology improvements in recent years, every fuel cell technology has limited short operating life, difficult for mass production, and still very expensive and unreliable. For example, the Proton Exchange Membrane Fuel Cell (PEMFC) requires a constant and continuous supply of hydrogen to the stacks (i.e. electrodes) to generate electricity and thus, a reliable source of hydrogen becomes a limitation in this process. Furthermore, fuel cell catalysts are sensitive to some residual hydrocarbons and/or impurities such as sulfur, calcium, magnesium, phosphors etc. and thus, the hydrogen fuel also needs to be purified, a yet further limitation of this process. Another required improvement in fuel cell technology is the seamless integration of the fuel reformer and the fuel cell stack for long hour continuous and reliable operation. For example, a sudden increase/decrease in power requirement can cause flow disturbance to the reformer and thus create unstable operation in the fuel cell stacks.

For fuel cell reforming technology, in U.S. Pat. No. 4,522,894 to Hwang, et al., herein incorporated by reference, hydrogen can be produced from commercial diesel oil by an autothermal reforming (ATR) process, and this reforming process can also be used to generate hydrogen from natural gas, LPG and JP-4 fuels. In this autothermal reforming process, a mixture of #2 diesel oil, water and air is fed into a reformer, which comprises two catalytic zones to yield hydrogen and CO for the fuel cell stack. In the first catalytic reaction zone, the majority of the hydrocarbon (i.e. diesel oil) is reacted over the monolithic palladium and platinum catalyst under very high space velocity (about 10 millisecond contact time) and the feed mixture preferably containing $H_2O$ to C ratio of 1.5 to 3.0 and an $O_2$ to C ratio of 0.35 to 0.55.

The main purpose of this reaction zone is to promote catalytic partial oxidation (CPO) reactions to convert most of the feed hydrocarbons into useful CO and hydrogen, and the produced reaction heats can simultaneously be used to raise the feed mixture to a temperature between 600 and 1000° C. for the subsequent second reaction zone. Depending on the $O_2$ to C ratio, either diesel oil or $O_2$ will completely be converted and totally be consumed in this CPO zone. Therefore, at $O_2/C<0.5$, all oxygen molecules are expected to be completely consumed, the diesel oil in the feed mixture can partially (up to 100%) be converted by this CPO reaction to CO and $H_2$, and the % oil conversion can be controlled by adjusting the $O_2/C$ ratio of the feed mixture. However, this reaction zone must avoid the complete combustion reactions of hydrocarbons, because the complete combustion reactions at high $O_2/C$ ratio>1.0 would produce $CO_2$ and water instead of $H_2$ and CO, and this $CO_2$ cannot be used by most of the fuel cell stacks to generate electricity. In other words, the complete combustion reactions directly convert useful fuels into waste products. Therefore, to improve the fuel cell's thermal efficiency, the optima $O_2/C$ ratio in the feed stream to the reformer must be kept within a narrow range, typically between 0.35 and 0.55.

In the second catalytic reaction zone of this ATR technology, the remaining small portion of the unconverted hydrocarbons are reacted with $H_2O$ in the presence of a steam reforming (SR) catalyst at 2,000 to 20,000/hr space velocity to yield more hydrogen and carbon monoxide. Since the rate of steam reforming reactions is much slower than that of the CPO reactions, the $H_2O/C$ ratio in the feed mixture has a limited effect on the reformer's overall hydrogen production. Thus, this ratio is typically kept below 3.0 without reducing the fuel cell's overall thermal efficiency. In other words, there are almost no advantages of using $H_2O/C$ ratio over 3.0 in the feed mixture.

In U.S. Pat. Nos. 6,436,363 and 6,849,572 to Hwang, et al., herein incorporated by reference, the ATR process and the layered Pt group metal catalysts can successfully be used to produce $H_2$ from natural gas or LPG. This ATR process and catalysts have been used in a hydrogen demonstration station as well as in several prototype PEMFC demonstration units for generating electricity from natural gas or LPG.

In addition to U.S. Pat. No. 4,522,894 to Hwang, et al., several U.S. patents such as U.S. Pat. No. 4,844,837 to Heck et al., U.S. Pat. No. 6,254,807 to Schmidt et al., U.S. Pat. No. 7,255,848 to Deluga et al., and U.S. Pat. No. 7,262,334 to Schmidt et al. have successfully demonstrated that the Pt group metal catalysts and the CPO reactions can produce within a very short contact time the CO and $H_2$ from various hydrocarbons, ethanol or other bio-fuels. Furthermore, recent study by Salge et al. (Science, Vol 314, Nov. 3, 2006) had concluded that CO and $H_2$ could be produced from soy oil and glucose-water over $Rh$—$CeO_2$ catalyst by the CPO reactions.

Fuel Pretreater, Vaporizer and Delivery System:

In U.S. Pat. No. 6,415,755 to Lathi and Johnson, herein incorporated by reference, a plate or a tube fuel processor is used to vaporize the fuel with the hot exhaust gas before injecting the fuel into a combustion source. In U.S. Pat. No. 5,794,601 to Pantone, herein incorporated by reference, a fuel pretreater apparatus and the method for pretreating an alternate fuel for internal combustion engines, furnaces, boilers and turbines are described. In this patent, an engine's by-pass exhaust stream is used to vaporize fuel in a volatilization chamber and also to carry this HC fuel through a heated reactor prior to its being introduced into the fuel burning equipment, such as an IC engine. The reactor is preferably interposed in the exhaust conduit and is formed by a reactor tube having a reactor rod mounted coaxially therein in spaced relationship. The exhaust stream passing through the exhaust conduit provides the thermal energy to the reactor to pretreat the vaporized fuel stream. This fuel processor for pretreating the fuels was later explained by the inventor as a self-inducing plasma generator. In this patent, the Pt group metal catalysts and the catalytic processes were not used to carry out the partial oxidation reactions of the fuels with the recycled exhaust gas, and it did not describe the requirement and necessity of controlling the $O_2/C$, $H_2O/C$ and $CO_2/C$ ratios of the fuel mixture.

In U.S. Pat. No. 5,947,063 to Smith et al, herein incorporated by reference, a pre-engine catalyst was used to produce synthesis gas (CO and $H_2$) from natural gas for the subsequent IC engine. Portion of the exhaust gas was also re-circulated to the engine together with additional injection of fresh air and natural gas. It was demonstrated that this feed mixture can reduce $NO_x$ formation and can improve engine's efficiency. However, though the synthetic gas was produced from natural gas by the catalytic partial oxidation reactions over a monolithic Rh catalyst, this pre-engine catalyst was not installed in the EGR line, and water was not used in the feed mixture. It is known that the addition of water in the feed mixture to the catalytic oxidizer can further reduce or prevent coke formation, which will allow and improve the utilization of various heavier HC as engine fuels. Furthermore, water can also improve the total hydrogen production via water gas shift and steam reforming reactions.

Though some current models of passenger car and diesel truck are equipped with EGR line and some exhaust gas is re-circulated back to the engine for the purpose of reducing the engine's peak temperature and, thus, reducing the $NO_x$ emission, there are no commercial on-board catalytic reformers currently installed in the EGR line, and no fuel/water/air mixture injected into this reformer for the purpose of providing hydrogen to assist and to improve combustion's efficiency of an engine or a gas turbine Plasmatron Fuel Converter:

In U.S. Pat. Nos. 5,425,332 and 7,028,644 to Rabinovich, Cohn et al, herein incorporated by references, a Plasmatron fuel processor can generate electrically conducting gas (plasma) and this plasma gas can initiate non-catalytic partial oxidation reactions of various fuels to produce hydrogen rich reformate for an IC engine. Based on their experiments, the addition of CO and $H_2$ gas to an IC engine's air inlet can increase gasoline engine's efficiency by 20-25%, reduce $NO_x$ emission up to 90% and reduce diesel engine's exhaust emission by 90%. Therefore, this plasma on-board reformer for the IC engines offers a cost effective near-term solution to reduce gasoline consumption and $CO_2$ emission. Furthermore, to remove emissions from trucks and buses, this Plasmatron fuel processor can also produce $H_2$ for the purpose of regenerating a $NO_x$ or a diesel particulate trap (Bromberg et al, Diesel Engine Emission Reduction Workshop, Newport, R.I., Aug. 24-28, 2003).

However, a fuel reformer containing Pt group metal catalysts has been found to be very effective in carrying out the catalytic partial oxidation reactions of various fuels to produce CO and $H_2$. Therefore, if this catalytic fuel reformer is installed in the EGR line and if it uses the hot exhaust gas to initiate the CPO reactions, this catalytic reformer can effectively be used to replace the non-catalytic Plasmatron fuel converter as an on-board fuel processor for the IC engines, and it can also be used to generate a reducing gas for the purpose of regenerating the $NO_x$ and/or diesel particulate traps.

Integrated Catalytic and Turbine System and Process for the Generation of Electricity:

A co-pending application U.S. Ser. No. 11/711,988 was filed on Feb. 28, 2007. According to this invention, a single integrated catalytic and turbine generator or a system combining several single integrated catalytic and turbine generators in series can be used to generate electricity. For example, a fuel mixture comprising the HC (or bio-fuel), steam and an oxygen containing gas are introduced into the reformer and are reacted over a Pt group metal catalyst in a reaction zone to produce a high pressure reformate containing steam, $H_2$, CO, $CO_2$, $N_2$, $O_2$ and unconverted HC. This high-pressure reformate stream can be used to drive a turbine and a generator to produce electricity. However, to improve the durability of the catalyst life, the $H_2O/C$ and $O_2/C$ ratios of the feed stream must be controlled individually and/or simultaneously so that the temperature in the reactor zone can continuously be kept between 150 and 1200° C., preferably between 150 and 1000° C.

From thermodynamic equilibrium calculations as demonstrated in this co-pending patent application, the addition of water (steam) into the air and fuel feed mixture can reduce the adiabatic temperature, and the reactor can be operated without coke formation in a broader range of $O_2/C$ and $H_2O/C$ ratios. In addition, due to higher heat capacity, the CPO reactions of the fuels in the presence of steam and $CO_2$ can reduce the reaction peak temperature and thus can improve the durability, life and the performance of the catalyst.

The first reformer's operating conditions of this single Integrated Catalytic and Turbine Generator system can be modified to convert fuels into $H_2$ for an IC engine or a gas turbine. For example, the reformer can be installed in the exhaust gas recycle (EGR) line to produce $H_2$ and CO from the fuels and the hot recycled exhaust gas, and it can also crack catalytically the heavier HC molecules into lighter HC molecules. The produced reformate which comprises unconverted HC, $H_2$ and CO can be admitted into an IC engine or a gas turbine to carry out additional homogeneous or catalytic combustion inside the engine/gas turbine. Since $H_2$ can be combusted more rapidly and cleanly, this on-board EGR Oxidizer can improve the performance of an IC engine or a gas turbine.

SUMMARY OF THE INVENTION

There is a provided a catalytic EGR Oxidizer installed in the engine/gas turbine's exhaust gas recycled (EGR) line comprising: (1). The process steps of introducing a reactant mixture of fuel, air, water and portion of the engine's recycled exhaust gas in a given range of $O_2/C$, $H_2O/C$ and $CO_2/C$ ratios into a reaction zone (i.e. oxidizer), reacting said reactant mixture over Pt group metal catalysts in said reaction zone at a given temperatures between 150-1200° C. and a given pressure between 1 to 10 atmosphere to produce rapidly (typically <300 milliseconds) and directly without using a heat exchanger a reformate stream comprising steam, $H_2$, CO, $CO_2$, $N_2$, $O_2$ and unconverted HC, (2). Feeding optionally said reformate stream from step 1 over a second catalyst zone at a given temperatures between 50-500° C. to convert portion of the feed water into hydrogen by the CO produced in step 1, and (3). Feeding said reformate stream from the oxidizer together with optionally controlled amount of fresh air and fuel into an internal combustion engine or a gas turbine to perform further catalytic or homogeneous combustion of $H_2$, CO and fuel. This EGR Oxidizer is primarily designed to be installed in the EGR line and, thus, can use the hot recycled exhaust gas to initiate the CPO reactions of the fuels without using any external heat devices. But to initiate the CPO reactions, the hot EGR exhaust gas can theoretically be replaced by passing the fresh air or any oxygen containing gas through a heat source. And this EGR Oxidizer can simply be installed in front of the IC engine/gas turbine without using the exhaust gas recirculation line.

The fuel mixture feeding into the catalytic oxidizer comprises fuels, air, water and a hot recycled exhaust gas. The fuel mentioned here can be selected from one or any mixture of the followings: $C_1$-$C_{16}$ hydrocarbons, methane, natural gas, LPG, the industrial waste or vent gas containing volatile organic compounds (VOC, mainly organic solvents), sugar, glucose, animal fats, $C_1$-$C_8$ alcohols, vegetable oils, bio-ethanol, bio-diesel, bio-methane and any vaporized soluble fuels derived from biomass or from agriculture/industrial/animal wastes. In theory, the Oxidizer's fuel source can be any gaseous fuels, liquid fuels or a combination of any fuel mixtures which can eventually be vaporized and can catalytically be oxidized over the Pt group metal catalysts to produce hydrogen and CO by the engine's recycled exhaust gas and/or by any $O_2$ containing gas.

The reaction zone includes a catalyst composition comprising one or more Pt group metal catalysts (especially Pt, Ru, Pd, and Rh) preferably supported on various type and shape of ceramic monolith, metallic monolith, pellet, wire mesh, screen, foam, plate etc. The terms "Pt group metal catalyst" refer to the group metals of Pt, Pd, Rh, Ir, Os, Ru and the oxides thereof. To improve the catalyst's durability and the operating life, it is necessary to optimize and control individually or simultaneously the % fuel, and the $H_2O/C$, $CO_2/C$ and $O_2/C$ ratios of the feed mixture so that the reactor's catalyst temperature is constantly kept below 1200° C. (preferably <1000° C.). For example, to maintain the catalyst's temperature below 1200° C. for natural gas or LPG fuels, the $H_2O/C$ ratio is preferably kept between 0.50 and 10.0, the $O_2/C$ ratio between 0.15 to 0.8, and the $CO_2/C$ ratio between 0.0 and 0.5.

Since the engine's exhaust gas comprises mainly $N_2$, $O_2$, $CO_2$ and steam, re-circulating the exhaust gas is an effective way to inject steam, $CO_2$ and heat into the system. If the fuel mixture comprises at least one low temperature light-off fuel component, the recycled hot exhaust gas can automatically initiate the CPO reactions over the Pt group metal catalysts without using any external heat sources. Therefore, this invention is to include at least one low temperature light-off fuel in the feed fuel mixture.

An optional second zone of the Oxidizer can be used to convert water and CO over a water gas shift catalyst to produce $H_2$ at a slower space velocity. For this optional second zone, the Pt group metal catalysts, which are supported on $Al_2O_3$, Ce/Zr Oxide and/or its oxide composite with thermal stabilizer and/or promoters, are preferred. But the traditional Cu/Zn oxide and/or Fe/Cr oxide catalysts can also be used in this reaction zone to increase the % $H_2$ and reduce the % CO in the Oxidizer's reformate gas.

Study by Hwang et al. (U.S. Pat. No. 4,522,894) had concluded that, at $O_2/C<0.5$, the diesel oil would preferentially react with oxygen until all oxygen molecules were consumed (i.e. 100% $O_2$ conversion). Therefore, the % fuel conversion (up to 100% conversion) could be controlled by the $O_2/C$ ratio of the feed stream.

The purpose of this oxidizer is to produce CO and $H_2$ from the fuels over the Pt group metal catalyst at a very high space velocity, and also to crack the heavier fuel molecules into smaller but often more reactive molecules by the CPO reactions. The $H_2$ and CO produced by this oxidizer at $O_2/C<0.5$ can then be admitted into an engine and/or gas turbine with optionally supplemental amount of air and fuels to achieve complete combustion of all combustible fuels inside the engine/gas turbine.

If this catalytic oxidizer and the engine/gas turbine are connected to an electric generator and a battery bank, it can generate and store electricity as a mobile or a stand-alone power station, which can be utilized as a stationary or a mobile electricity generator for transportation, utility and other industrial and household applications.

DESCRIPTION OF THE PREFERRED EMBODIMENTS

A new and novel on-board catalytic oxidizer consisting of a catalytic reformer installed in an EGR gas line to pretreat fuels especially bio-fuels for an IC engine or a gas turbine is provided. It can be combined with a generator and a battery bank to produce and to store electricity from the hydrocarbons or any renewable bio-fuels.

Hydrocarbon Reaction Zone in the EGR Gas Line

In the first process step of the present invention, a fuel mixture is introduced into a reaction zone as reactants. The fuel mixture comprises of fuels, steam and the oxygen containing gas. The fuel may be selected from one or any mixture of the followings: $C_1$-$C_{16}$ hydrocarbons, natural gas, volatile organic compounds, sugar, glucose, animal fats, $C_1$-$C_8$ alcohols, vegetable oils, bio-ethanol, bio-diesel, any fuels derived from biomass or from agriculture/industrial/animal wastes etc. In other words, the fuel can be any gaseous hydrocarbons, any liquid fuel and/or liquid fuel mixture, which can eventually be vaporized and can also be partially oxidized over the Pt group metal catalysts to produce hydrogen and CO. For example, typical useful fuels can be selected from one and/or any combination of natural gas, biomass waste gas, LPG, jet fuel, gasoline, diesel, bio-ethanol, bio-diesel, corn oil, olive oil, soybean oil, methanol, ethanol, propanol, butanol, and biobutanol. The renewable fuels are the preferred fuels for this application.

The $O_2$ containing gas can be air, pure $O_2$, enriched oxygen gas, or the re-circulated exhaust gas (EGR) consisting mainly of steam, $CO_2$, $N_2$, and $O_2$. Though air can successfully be used for this application, the engine/gas turbine's hot re-circulated exhaust gas containing steam and $CO_2$ can be used to vaporize the fuel and water, and to initiate the catalytic partial oxidation reactions of the fuels without using an external heat source. Therefore, it is the preferred source of oxygen for this Oxidizer.

The fuel, steam and the re-circulated exhaust gas may be mixed prior to feeding into the reaction zone, or may be fed separately into the reaction zone. Even if the reactants are introduced into the reaction zone separately, they become mixed in the reaction zone, and thus, this embodiment is still encompassed by the language used herein that the fuel mixture is introduced into the reaction zone.

Any conventional reactors may be used as the reaction zone. The reactor may take the form of a reformate generator or an oxidizer/reformer.

The reaction zone includes a catalyst composition, which can be a Pt group metal catalyst unsupported or supported with any known supports. If supported, the Pt group metals can be deposited on the surface of the support directly, or they can first be deposited on a high surface area washcoat material, and this catalyzed washcoat can then be coated on the surface of a more thermally stable low surface area material. Examples of the viable high surface area washcoat support materials include but are not limited to alumina, alumina-silica, alumina-silica-titania, cerium oxides, zirconium oxide, cerium-zirconium-rare earth oxide and its composite, and other oxide composite thereof. Furthermore, one or more rare earth metal oxides, alkaline oxides and/or the oxides of lanthanum, cerium, zirconium, praseodymium, yttrium, calcium, barium, strontium, magnesium etc can be used to stabilize thermally the Ce—Zr Oxide or oxide composite. Examples of the low surface area supports can be ceramic materials such as mullite, cordierite, zirconia-spinel, zirconia-mullite, silicon carbide etc. These low surface area supports are substantially inert rigid materials, which are capable of maintaining their shape, surface area and a sufficient degree of mechanical strength at high temperatures.

The catalyst composition includes at least one Pt group metal components such as platinum, palladium, rhodium, iridium, osmium and ruthenium or mixtures thereof, preferably supported on a washcoat, and this catalyzed washcoat is further supported on various types and shapes of ceramic monolith, metallic monolith, pellet, bead, gauze, wire mesh, screen, foam, plate etc. Other metals may also be present, including the base metals of Group VII and metals of Groups VB, VIB and VIB of the Periodic Table of Elements (e.g., chromium, copper, vanadium, cobalt, nickel, iron, etc). Though the applications and the operation conditions are different, typical supported ceramic or metallic monolith catalysts, which are originally designed for fuel cell reformers as described in U.S. Pat. Nos. 4,522,894, 6,436,363 and 6,977,067, can successfully perform catalytic partial oxidations and steam reforming reactions and, thus, can be used for this invention.

The catalyst composition in the first reaction zone serves to facilitate or promote partial oxidation reactions among the fuel, steam and oxygen containing gas. More description on the reforming of #2 diesel oil into hydrogen by an autothermal reformer is provided in U.S. Pat. No. 4,522,894, which is hereby incorporated by reference. Multiple reactions, including steam reforming, partial oxidation, combustion, water gas shift etc. can occur simultaneously over the same Pt group metal catalysts in the reaction zone (i.e. oxidizer/reformer). For example, with the presence of water in the feed mixture, the CO produced by the CPO reactions of fuels can be used to convert water into $H_2$ over the same catalysts by performing the water gas shift reaction, and additional amount of $H_2$ can also be produced simultaneously from fuels and steam by the steam reforming reactions. In other words, portion of the feed water can increase the total amount of $H_2$ produced, reduce the CO concentration in reformate and, thus, part of the feed water is actually becoming a fuel to the engine/gas turbine.

Because the catalysts are prone to deactivation and breakdown at high temperatures (e.g., exceeding 1200° C.), it is preferred that the reaction zone be kept at temperatures between 150-1200° C., preferably between 150-1000° C. To initiate the CPO reactions, the fuel mixture or the reaction zone may be preheated to a temperature between 150-600° C. by using any known conventional furnaces, heat exchangers, an electric flame igniter such as electric hot wire, glow plug, an electrically heated monolith catalyst etc. However, if the engine's hot exhaust gas is used as the oxygen source and if the fuel mixture comprises at least one low temperature light-off fuel component, the hot exhaust gas can automatically initiate the CPO reactions over the Pt group metal catalysts without using any external heat sources. Therefore, this invention is to include at least one low temperature light-off fuel in the feed fuel mixture.

To produce reformate gas with the recycled EGR gas, the following key ratios (factors) must be monitored in the feed mixture so that the reaction temperature can be controlled within the desired range: a) $H_2O$ to C ratio, b) $O_2$ to C ratio and c) and $CO_2$ to C ratio. More specifically, it is preferred that the $H_2O$ to C ratio is between 0.5 and 10.0, the $O_2$ to C ratio is between 0.15 and 1.5 (preferably 0.2-0.7) and $CO_2/C$ ratio is between 0.0 and 0.5. Since the latent heats of all useful fuels mentioned in this invention vary in a wide range and all the reaction rates of the fuels over the Pt group metal catalysts are very fast, these ratios should be controlled individually and/or simultaneously to keep the Oxidizer above a minimum operating temperature, and also to limit the reformer's maximum operating temperature below 1200° C. (preferably below 1000° C.). The adjustments of these ratios to control the reaction zone temperature can be within and/or outside the operating ranges mentioned previously and are within the skills of one skilled in the art.

For example, when methane is used as the hydrocarbon fuel, the following reactions are known to occur:

Catalytic Combustion: $CH_4 + 2O_2 \rightarrow CO_2 + 2H_2O$

Catalytic Partial Oxidation Reaction: $CH_4 + \frac{1}{2}O_2 \rightarrow CO + 2H_2$ Steam Reforming Reaction: $CH_4 + H_2O \rightarrow CO + 3H_2$ Water Gas Shift Reaction: $CO + H_2O \rightarrow CO_2 + H_2$ On the other hand, when ethanol is the fuel, the following reactions occur:

Complete Combustion: $C_2H_5OH + 3O_2 \rightarrow 2CO_2 + 3H_2O$

Catalytic Partial Oxidation: $C_2H_5OH + \frac{1}{2}O_2 \rightarrow 2CO + 3H_2$

Thus, different fuels produce different amounts of $H_2$, CO, $CO_2$ and steam.

Different fuels also result in different amount of heat being produced. For example, while the catalytic partial oxidation reaction (CPO) for methane is an exothermic reaction, the catalytic partial oxidation reaction for ethanol is an endothermic reaction. Therefore, one skilled in the art would thus appreciate that different $CO_2/C$, $O_2/C$ and $H_2O/C$ ratios are needed for optimal operating conditions in the reaction zone (i.e. 150-1200° C.) due to the difference in oxidation reaction heats and product quantity.

Fuel Cell Fuel Processor vs. EGR Oxidizer:

For a fuel cell's fuel processor to produce hydrogen from the HC fuels, it is necessary to convert all HC molecules into $H_2$ and CO in the reforming stage, because the subsequent catalytic stages in a fuel cell reformer such as the water gas shift (WGS) and the preferential oxidation (PROX) can not convert any remaining HC. For this reason, the sole purpose of the WGS and the PROX catalysts inside a PEMFC fuel processor is to convert and to remove the CO, which will poison the fuel cell stack's electrode catalysts. Therefore, to improve fuel cell's thermal efficiency, this fuel processor must be operated under the conditions (i.e. mainly $O_2/C$, $H_2O/C$ and temperature) that all HC fuels are converted in the reforming stage. However, the IC engine/gas turbine can further combust catalytically or homogeneously the $H_2$, CO and the unconverted HC fuels and, thus, the EGR Oxidizer does not required to convert all the HC molecules. In other words, the operating conditions of this Oxidizer should be optimized to achieve the combined total efficiency of both the Oxidizer and the IC engine/gas turbine, and this EGR Oxidizer should be designed and be operated differently from that of the fuel cell fuel reformer. Furthermore, some fuel cell stack's efficiency for generating electricity depends on the % $H_2$ in the reformate gas, the lower the % $H_2$, the lower the efficiency. Therefore, the use of the recycled exhaust gas as a feed reactant to a fuel cell reformer is not preferable, because it will introduce additional $N_2$ dilution into the system, reduce % $H_2$ in the product gas and thus reduce the stack's efficiency.

On-Board Hydrogen Reformer for IC Engines and Gas Turbines

Since global warming and high crude oil price are becoming more serious problems worldwide, new hydrogen engines as well as other new engines, which are capable of using renewable fuels such as ethanol or bio-diesel, are currently being developed and/or optimized for these new fuels. When a newly developed engine, which can use reformate gas as fuel, is available, an on-board reformer using either the ATR or the CPO reforming technologies can be very suitable to pretreat fuels for this new reformate engine. Since hydrogen can assist homogeneous combustion of HC fuels inside the engine, and since hydrogen can easily be made from various fuel sources with up to 100% fuel conversion by either the ATR or the CPO technologies, a new reformate IC engine equipped with this on-board reformer will have an advantage and flexibility over the current IC engines in its capability of using various fuels, especially bio-fuels and high molecular weight fuels.

As discussed in U.S. Pat. No. 4,522,894 to Hwang et. al, an autothermal reformer (ATR) containing a monolithic Pt/Pd CPO catalyst in the first stage and a Pt/Rh steam reforming (SR) pellet catalyst in the second stage could successfully be used to convert 100% of a sulfur containing commercial diesel oil into $H_2$ and CO, and this reformer could successfully be connected to a fuel cell stack to generate electricity. For example, at $O_2/C=0.413$ and $H_2O/C=2.56$, an on-board hydrogen reformer can use this ATR technology to convert completely the diesel oil into a reformate gas comprising (dry % composition) 39.94% $H_2$, 8.85% CO, 14.16% $CO_2$ and 36.78% $N_2$ (Hwang et. al., DOE report DE-AC-03-79-ET15383, September, (1981)), and this reformate gas can be used together with additional amount of air and optional amount of fuel to power a new reformate IC engine/gas turbine. Furthermore, under the same $O_2/C=0.413$ and $H_2O/C=2.56$ experimental conditions, the CPO stage of this ATR reformer could produce the gas composition (% dry gas from the same test) comprising 28.13% $H_2$, 21.14% CO, 4.09% $CO_2$, 45.31% $N_2$, 0.73% $CH_4$, 0.04% $C_2H_6$, 0.18% $C_2H_4$, and 0.08% $C_3H_6$. Since an IC engine/gas turbine can further combust $H_2$, CO and HC fuels, this reformate produced by the CPO technology can also be used as a fuel source for the yet to be optimized and/or developed new reformate IC engine/gas turbine.

From these experimental results, it can also be concluded that the catalytic diesel oil conversion to $H_2$ and CO was initially dominated by the fast CPO reactions over the slower SR reactions until all oxygen was consumed. As described in U.S. Pat. No. 4,522,894 to Hwang et. al, the % HC conversion could be controlled by the $O_2/C$ ratio in the inlet gas stream, and up to 100% of HC could be converted to $H_2$ and CO at $O_2/C$ ratio<0.5. Using the same process and catalysts, it had been demonstrated that $H_2$ and CO could also be generated from other HC fuels such as LPG, JP-4 fuel and natural gas (Hwang et. al, AICHE Annual Meeting, Los Angels, Calif. Nov. 15, 2000). Though both the ATR and the CPO reformer can be used as an on-board reformer, the CPO reactions of fuels over the Pt group metal catalysts can be done under a very high space velocity condition (>100,000/hr or prefer <30 milliseconds) and the steam reforming reactions are relatively very slow (2,000-20,000/hr). Therefore, an on-board reformer using the CPO reforming technology will have much smaller reactor volume and, thus, is the preferred technology for this application.

If this catalytic fuel reformer is installed in the EGR line, and if the fuel mixture can consist of at least one low temperature light-off compound, the CPO reaction of this low light-off compound will be initiated first by the hot re-circulated exhaust gas without using any external heat devices and, then, the heats so produced will be used to initiate other CPO reactions of the entire fuel mixture to produce $H_2$ and CO. Therefore, the EGR Oxidizer can also be used to pretreat and to vaporize the heavy HC without forming coke in the fuel delivery lines. It can thus expand the fuel sources and potentially allow the biomass fuels to be used by the IC engines/gas turbine, especially a hydrogen engine.

To use the EGR Oxidizer's reformate gas as a fuel for a potential new reformate engine/gas turbine, the engine/gas turbine's design factors such as the ignition timing, fuel and air injections, temperature, pressure, air/fuel ratio, auto-ignition or pre-ignition of the fuel mixture, or % exhaust recirculation etc must carefully be considered. Therefore, to improve the overall thermal efficiency, both EGR Oxidizer and the engine/gas turbine should be designed and operated together as a system.

As discussed previously, the Plasmatron fuel converter could be used to produce $H_2$ for assisting the combustion and also improving the thermal efficiency of an engine, and it can also be used to regenerate $NO_x$ or diesel particulate traps. However, contrary to this Plasmatron fuel converter while an external electrical source is required for performing the CPO reactions, this EGR Oxidizer can automatically initiate and perform the CPO reactions itself with the hot recycled exhaust gas. Thus, this EGR Oxidizer can effectively be used to replace the Plasmatron fuel converter as an on-board hydrogen reformer for the IC engines and gas turbines, and for regenerating the $NO_x$ and diesel traps.

Producing Hydrogen from Water

Most common method to produce hydrogen from water is by electrolysis. For example, a constant electric voltage and direct current are supplied to the electrodes, which are immersed in an electrolyte solution. The water molecules will be dissociated to produce hydrogen and oxygen from the anode and cathode. Another useful method to produce $H_2$ from water is by catalytic processes. As shown previously, $H_2$ can be produced catalytically by the chemical reaction between water (steam) and CO over catalysts at a temperature between 50 and 500° C. The typical catalysts used for this water gas shift reaction are Cu—Zn oxide, Cu—Zn—$Al_2O_3$, Fe—Cr oxide, and metal/oxide mixed catalysts such as Pt, Pd, Rh, Ni, Co, Fe or Ru catalysts supported on $Al_2O_3$, $CeO_2$, Ce—Zr oxide, Ce—Zr-rare earth oxide. The oxides of La, Ba, Pr, Re, Mo, Zn, Sr, and Y etc. can also be used to stabilize the Ce—Zr oxide or its oxide composite for high temperature application. Since the EGR Oxidizer can produce CO from fuels by the catalytic partial oxidation reactions, the CO produced can then be used to break the chemical bonds of the water molecules to produce $H_2$ in the optional second zone of the Oxidizer.

Using the supported Pt group metal catalysts or Ni catalyst, hydrogen can directly be produced from water and HC fuels by steam reforming reactions. Therefore, portion of the feed water is actually becoming a fuel to the engine/gas turbine.

Renewable Fuels from Agriculture or Waste Products:

In addition to use the fossil hydrocarbons as fuel source, CO and hydrogen can also be produced by the autothermal reforming process from bio-ethanol (G. A. Deluga et al., Science, Vol. 303, Page 993, 2004) and from sugar water (J. R. Salge et. al. Science, Vol 314, Page 801, 2006). In other words, the vaporized HC and/or biomass fuels such as oils, bio-fuels, and fuels which are derived from some agriculture/industrial/animal wastes, sugar, fresh vegetable oils, soluble animal fats etc. can be converted without forming coke over the Pt group metal catalysts. Therefore, the fuels can be pretreated by this EGR Oxidizer to produce $H_2$ and CO, and the heavier HC molecules can also be cracked catalytically into lighter molecules. Therefore, with the addition of this Oxidizer to the EGR line, a new reformate IC engine or a gas turbine can potentially expand their fuel source and can directly use some heavy molecular weight fuels to generate power and electricity.

Since high molecular weight HC such as gasoline, diesel oil, vegetable oils etc. will form separate phase with water, they have to be injected into the EGR Oxidizer separately as shown in U.S. Pat. No. 4,522,894. However, if appropriate amount of alcohols (such as methanol, ethanol, ethylene glycol) or surfactants are added to the above fuel and water mixture to increase their mutual solubility, these liquid fuels (i.e. reactants) can be blended together to form a single phase aqueous solution and, thus, can be stored in a single feed tank. As known, a single aqueous fuel mixture can simplify the feed injection, flow delivery and flow control.

During the energy transformation processes, the atmospheric $CO_2$ can be recycled and be converted naturally by tree, grass and plants into agriculture products and these products can then be made into energy fuels. Thus, the net $CO_2$ produced from these bio-fuels is counted as zero according to Kyoto Protocol. In other words, the use of renewable bio-fuels and the fuels from some waste products as a reactant in this invention can effectively reduce the overall greenhouse gas production.

An External Device to Regenerate $NO_x$ and Diesel Particulate Traps

Lean burn gasoline and diesel truck engines are becoming more popular in recent years. Since the lean burn IC engines will produce more $NO_x$ pollution as compared to an engine running with a stoichiometric air/fuel mixture, a monolithic filter trap is installed in the exhaust gas line to remove the $NO_x$ emission. Similarly, a diesel particulate filter is installed in the exhaust line to remove the particulate emissions from a diesel truck exhaust gas. Typically, the catalytic trap materials used in a trap or filter may include Pt group metals and one or more oxides of K, Na, Cs, Ba, La, Sr, Ca, Mg, Zn and the mixture thereof. However, each trap material has its own storage capacity; it will not function and will not reduce the $NO_x$ emission once it is saturated. Therefore, there is a need to regenerate this trap material using an external reducing gas.

It is known from the recent studies that the hydrogen produced by a Plasmatron fuel converter is very effective in regenerating the engine's $NO_x$ and diesel particulate traps ("Hydrogen Generation from Plasmatron Reformers", L. Bromberg et al. Diesel Engine Emission Workshop, Aug. 24, 2003). Therefore, this new EGR Oxidizer, which is very effective in producing CO and $H_2$ from various fuels, can be used to regenerate $NO_x$ and diesel particulate traps.

Exemplary Embodiments Described

Using the teachings of the present invention, a number of different catalytic oxidizer and system configurations are available to one skilled in the art.

Figure 1:
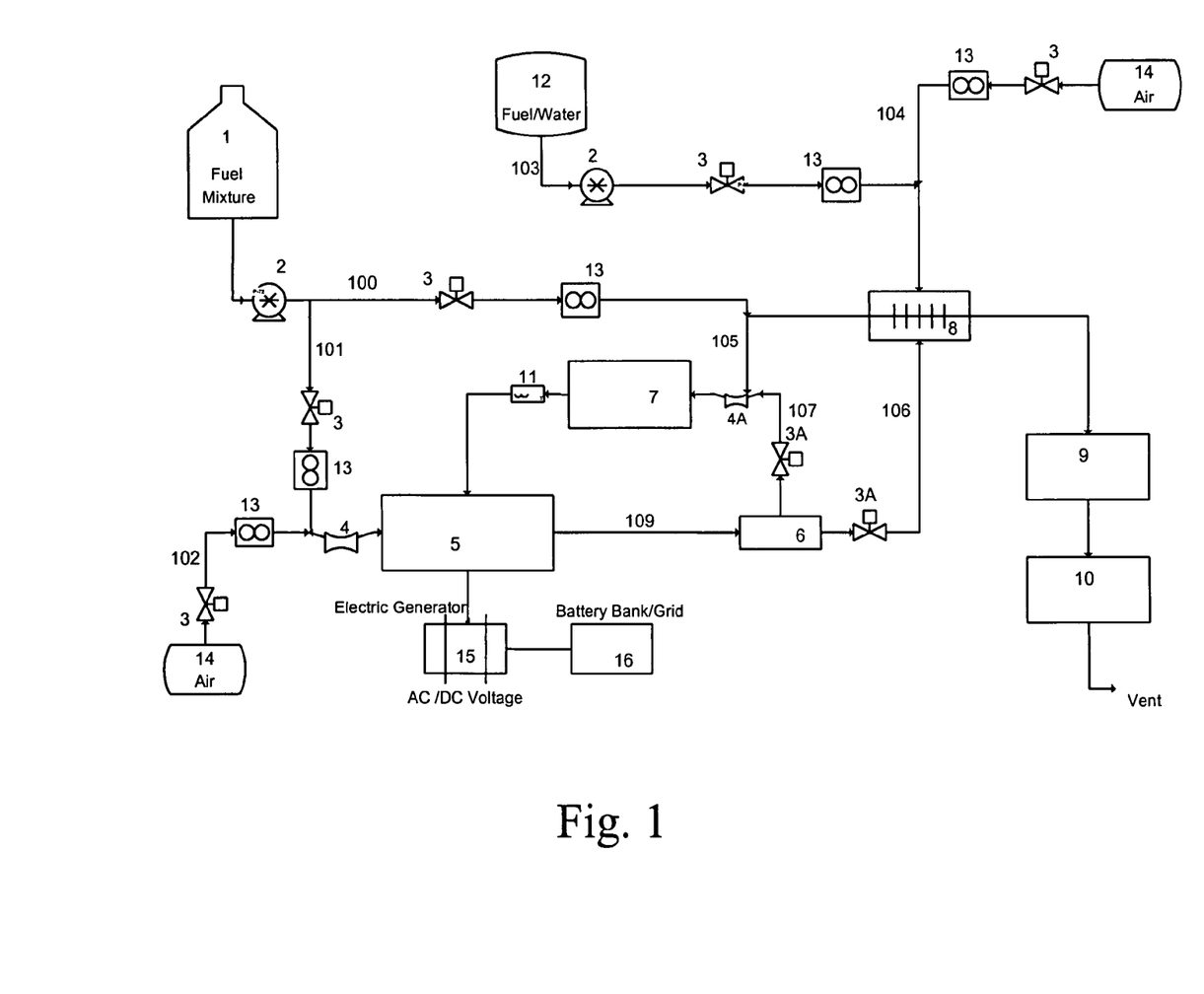
FIG. 1 is a schematic illustration of a system containing a catalytic oxidizer and an IC engine in accordance with an exemplary embodiment of the present invention.

For example, as shown in an exemplary embodiment in FIG. 1, fuel in storage tank 1 can be pumped into the system by pump 2, and it will be split into streams 100 and 101. Fuel stream 101 and a compressed air stream 102 are injected into a venturi injector (or a carburetor) 4 and admitted into engine/gas turbine 5. Various control valves 3 and flow controllers 13 are installed in each feed stream to control the $O_2/C$ ratio of the feed mixture. After combustion, the exhaust gas is split from a filter/accumulator (or a closed couple catalyst) 6 into streams 106 and 107. A flow valve 3A is used in each gas line to control the % of the exhaust gas being re-circulated through the EGR line into the catalytic oxidizer 7 and engine 5. Stream 103 of water or water/fuel mixture and a supplemental air stream 104 can be combined and then passed through a heat exchanger 8, where the water is first vaporized, and the steam and air mixture is preheated by the exhaust stream 106. This heated steam and air mixture, a fuel stream 100 and the exhaust stream 107 are injected into a venturi injector 4A and then reacted by the catalysts in the oxidizer 7. Again, valves 3 and flow controllers 13 are installed in each feed lines to control the flow rate of each stream, so that the $O_2/C$, $H_2O/C$ and $CO_2/C$ ratios of the oxidizer's feed mixture are properly controlled. Since most of the catalytic partial oxidation reactions are exothermic and almost all oxygen in the feed mixture is completely converted when $O_2/C<0.5$, the measured reactor's outlet temperature is closely related to the $O_2/C$ ratio. Therefore, thermocouple 11 can be used to measure the reaction temperature inside the oxidizer, and it can actually be used as a feedback controller to adjust flow rate of each feed stream (i.e. $O_2/C$ ratio), so that the reaction temperature is constantly kept below 1200° C. (preferably below 1000° C.). In other words, the installation of this TC can avoid run away oxidation reactions, minimize catalyst thermal deactivation and improve its durability. After the oxidizer, the product gas, which comprises $H_2$ and CO, is admitted into engine 5 together with additional (optional) amount of make-up fuel (stream 101) and air (stream 102) to carry out further combustion inside engine/gas turbine 5.

As shown in FIG. 1, the supplemental air and fuel from lines 102 and 101 can provide air and fuel (if necessary) to the reaction zones during the operation, especially during the start-up of this catalytic oxidizer. The exhaust stream 106 is used to preheat the water and air streams 103 and 104 in the heat exchanger 8; it is then passed through a catalytic converter 9 to remove any remaining pollutants and then a muffler 10 before being discharged into the atmosphere.

In FIG. 1, an electricity generator 15 and a battery bank/grid 16 are used to generate, store or transmit electricity. Therefore, this integrated system can be used in applications such as stationary or mobile power generation, transportation and utility.

Since most of the heavy molecular weight HC fuels such as diesel oil or vegetable oils have a tendency to form coke when heated inside a heat exchanger, the fuel stream 100 should not pass through the heat exchanger 8, as shown in FIG. 1. However, for lighter and more stable HC fuels, it can be mixed with water and air before injecting into the heat exchanger 8.

Figure 3:
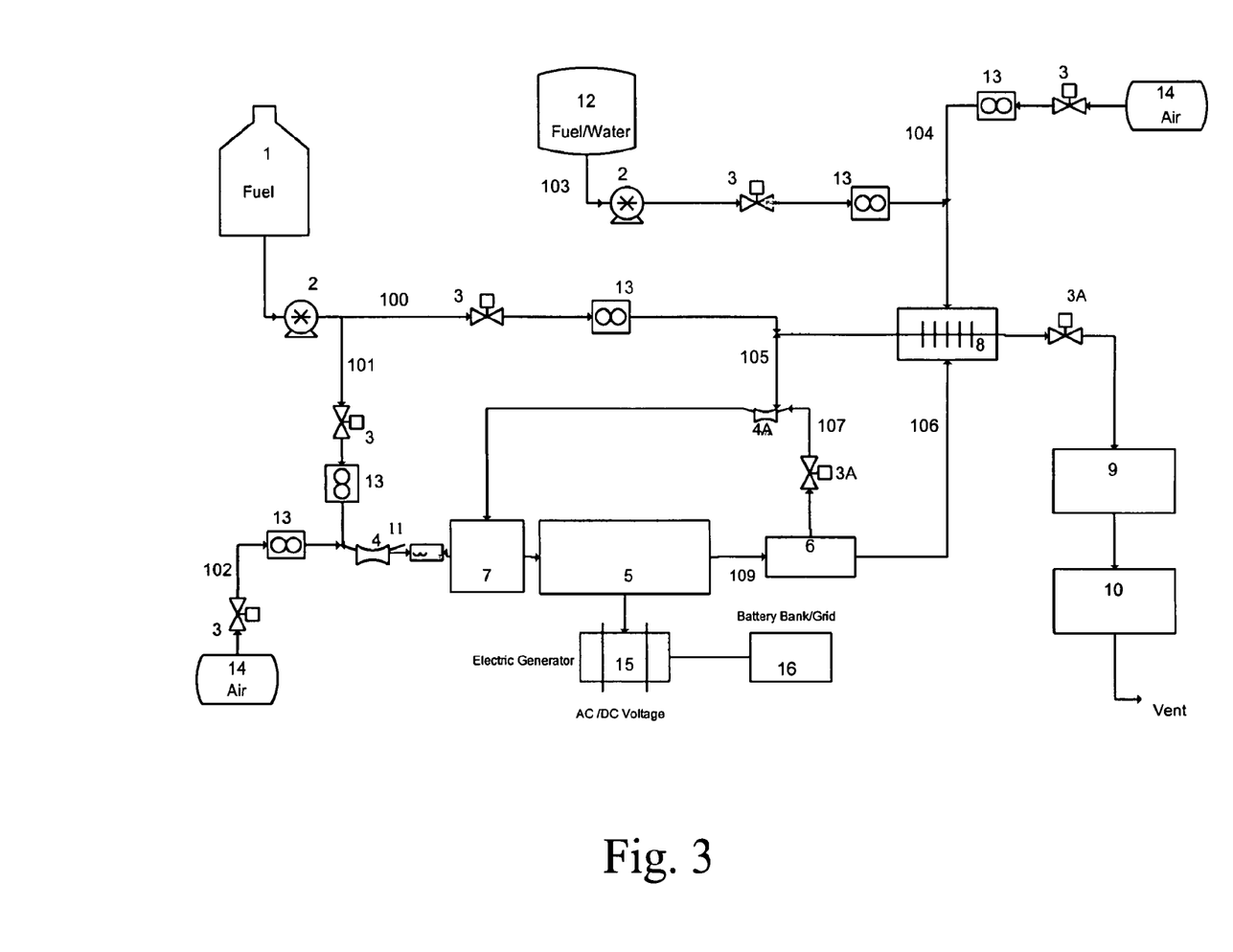
FIG. 3 is a schematic illustration of a system containing a catalytic oxidizer and an IC engine in accordance with another exemplary embodiment of the present invention.

As mentioned previously, most HC and alcohol fuels can be converted into $H_2$ and CO by the Pt group metal catalysts at a very high space velocity (residence time<300 milliseconds), and water can participate in steam reforming and water gas shift reactions over catalysts inside the EGR Oxidizer. Therefore, any fuel mixture containing HC fuels, alcohol, water and optional surfactants can be premixed according to a given $H_2O/C$ ratio and store in a single storage tank 12, as shown in FIGS. 1 & 3. A single-phase aqueous fuel-water mixture can greatly simplify the flow control and system operation.

Figure 2:
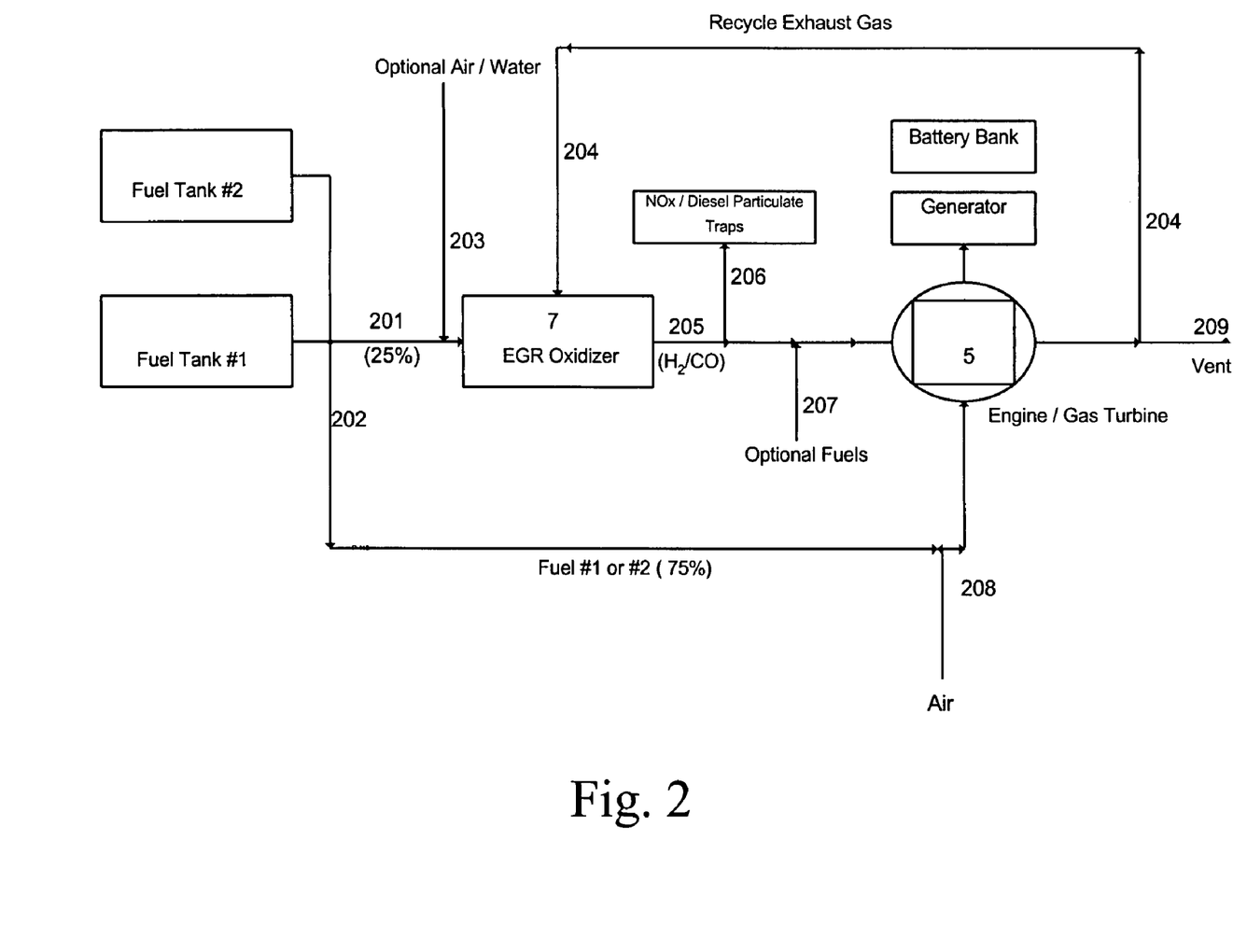
FIG. 2 is a simplified operating flowchart of a system containing a catalytic oxidizer and an IC engine in accordance with an exemplary embodiment of the present invention.

FIG. 2 is a simplified operating flowchart of the system described in FIG. 1. Note that the fuel and/or the fuel mixture can be divided into two streams. When the $O_2/C$ and the reactor temperature inside the Oxidizer are controlled properly, both the oxygen (from streams 203 and/or 204) and the fuel molecules of the smaller fuel stream 201 (say about 25%) will be converted completely inside the EGR Oxidizer 7 into $H_2$ and CO. After reacted, this Oxidizer's reformate stream 205, the remaining larger portion of the fuel stream 202 (or fuel mixture) and the additional supplemental air stream 208 can be injected together into an IC engine/gas turbine 5. The purpose of this EGR Oxidizer is to produce $H_2$ and CO with 100% conversion from portion of the fuel stream 201 to assist and to improve further catalytic and/or homogeneous combustion of the remaining fuels stream 202 inside the IC engine/gas turbine. Furthermore, portion of the Oxidizer's reformate stream 206, which comprises $H_2$ and CO, can be used to regenerate the $NO_x$ and/or diesel particulate traps as also shown in this figure.

FIG. 3 shows another exemplary embodiment of this invention, where the EGR Oxidizer 7 is installed either as a separate or as a continuous integral part of the engine/gas turbine 5. In this case, the engine will be started with the fuel in stream 101 and the air in stream 102. Again, valves 3 and flow controllers 13 are used to control the $O_2/C$ ratio. The exhaust gas stream 109 is split into streams 106 and 107 at the accumulator or the closed coupled catalyst 6. The recycle gas stream 107, any supplemental air stream 104, the fuel stream 103 and the controlled supplemental amount of fuel stream 100 can be injected at injector 4A into the Oxidizer 7 to provide proper $O_2/C$, $H_2O/C$ and $CO_2/C$ ratios of the feed mixture. Under this condition, all fuel or fuel mixture coming from both fuel tank 1 and fuel tank 12 will be passing through the Oxidizer during the normal operation, the $O_2$ in the feed mixture will be completely reacted, the heat generated by the catalytic partial oxidation reactions can be used to vaporize and preheat the water and up to 100% of fuels will be converted (the % fuel conversion will depend on the $O_2/C$ ratio). To complete the total combustion of all fuels in this reformate, additional controlled amount of $O_2$ must be injected into the engine/gas turbine 5, i.e. after the Oxidizer and before the engine. Therefore, during this stage of operation, the air in stream 102 must be bypassing the Oxidizer and it will be injected directly into the engine/gas turbine (bypassing line is not shown in FIG. 3). Again. Thermocouple 11 is used to indicate the reactor temperature and it can also be used as a feed back temperature controller to keep the maximum reactor temperature constantly <1200° C. by adjusting the $O_2/C$ ratio of the incoming feed into the Oxidizer.

Earlier study had concluded that when the $O_2/C$ ratio and the reactor temperature are controlled properly, the more reactive propylene can selectively be converted into $H_2$ and CO by the catalytic partial oxidation reaction of LPG fuel and, under this reaction condition, the more stable propane in the LPG fuel remains mostly unchanged (Hwang et al, U.S. Pat. No. 6,977,067). Therefore, by adjusting the $O_2/C$ ratio and the reactor temperature, some active components in the fuels from fuel stream 100 and stream 103 will be converted catalytically into $H_2$, CO and smaller HC molecules in the Oxidizer, while the more stable components of the fuel will simply be vaporized. In other words, the Oxidizer will produce $H_2$ and CO from the active components of the fuels, while it simply acts as a fuel vaporizer as well as a fuel pretreater of the more stable components for the engine/gas turbine.

Figure 4:
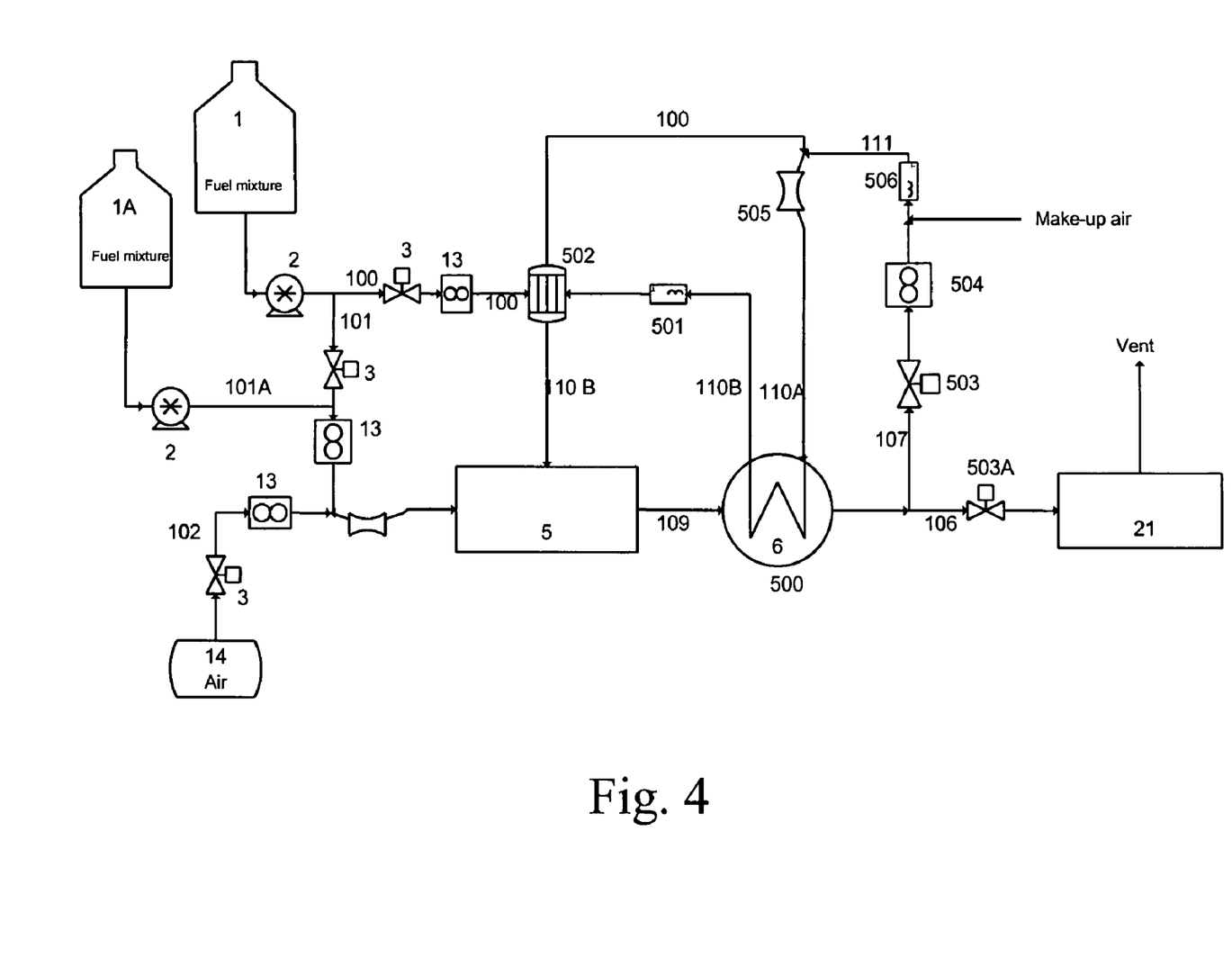
FIG. 4 is a schematic illustration of a system containing a catalytic oxidizer and an IC engine in accordance with another exemplary embodiment of the present invention.

FIG. 4 shows another exemplary embodiment of this invention, where the EGR Oxidizer is incorporated into the exhaust gas catalytic converter 6. For example, for a shell and tube heat exchanger, a catalyst coated on the tube side of the heat exchanger will produce reaction heat by the catalytic oxidation reactions of any unburned HC molecules coming out of the engine/gas turbine, and this heat will be transferred to the shell side to combine with the hot recycled exhaust gas to initiate the partial oxidation reactions of the fuels in the Oxidizer side of the heat exchanger.

As shown in FIG. 4, either fuel stream 101 or stream 101A can be used to start the engine with air stream 102. The unburned HC and CO which are present in the engine's exhaust stream 109 will be converted by the commercial exhaust catalyst in the tube side of the heat exchanger 6, and the gas is then split into stream 106 and 107 with the control valves 503 and 503A. Fuel stream 100 will first pass through heat exchanger 502 and then combine with stream 107 and the optional supplemental amount of make-up air at the venture mixer 505. Together, they will be passing through the Oxidizer's catalyst side of the heat exchanger 6 to produce $H_2$ and CO and, then, be injected into the engine/gas turbine 5. Again, thermocouples 506 and 501 are used to monitor the temperatures. The exhaust stream 106 will be passing through a muffler 21 and be eventually vented into atmosphere.

In addition to a metallic shell and tube heat exchanger, a cross flow monolith or a fin-type exchanger, which can have one type of catalyst coated in one side and another type of catalyst coated in the other side, can also be used here.

The system shown in FIG. 4 is particular useful for a small engine/gas turbine system, where the equipment volume and the typical low exhaust gas temperature may have problems to initiate the catalytic partial oxidation of fuels in the Oxidizer.

Figure 5:
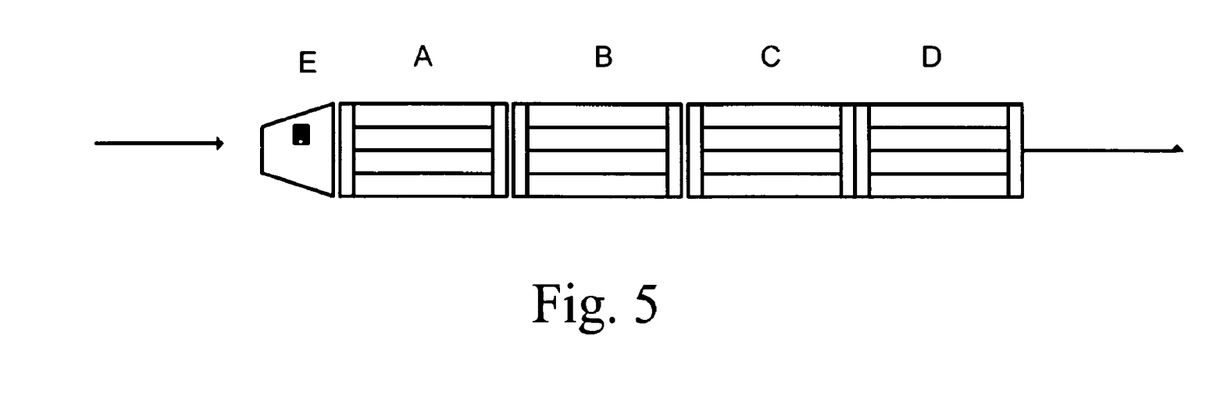
FIG. 5 is a schematic illustration of catalysts being used inside the EGR oxidizer in accordance with the exemplary embodiment of the present invention.

The catalysts in the Oxidizer can be arranged as shown in FIG. 5, where samples A, B, C and D are supported monolithic Pt group metal catalyst containing one or more metals, especially Pt, Pd, Rh, Co, Ni and Fe. The total individual or mixed metal loadings in each of the four samples can be the same, or they can gradually be increased in metal loading to form a gradient catalyst system as shown in U.S. Pat. No. 6,436,363. The diameter of these samples can be the same as shown in FIG. 5. Also shown in FIG. 5, sample E is a flame igniter or an electric ignition device to initiate the catalytic partial oxidation reactions in the Oxidizer 7. The ignition device can be an electric hot wire, an electric glow plug or an electrically heated monolithic catalyst containing Pt group metals. However, the hot EGR exhaust gas can sometimes initiate the CPO reactions without any external heat source, especially if the fuel or fuel mixture comprises at least one low temperature light-off fuel.

Figure 6:
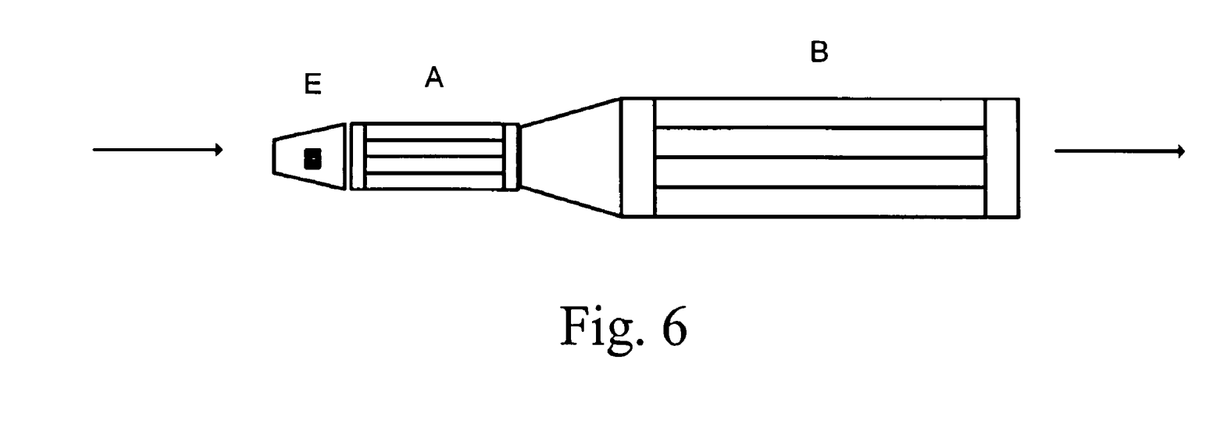
FIG. 6 is a schematic illustration of catalysts being used inside the EGR oxidizer in accordance with another exemplary embodiment of the present invention.

The catalyst samples inside the Oxidizer can have different diameter as shown in FIG. 6. Sample A with a smaller diameter can be a supported Pt/Pd CPO catalyst formulation to convert fuel mixture by the fast partial oxidation reaction, while sample B with a larger diameter can be a supported Pt/Rh catalyst to emphasis the conversion of fuels by the slower steam reforming and water gas shift reactions. Again, samples A and B can have different Pt group metal loading and they can even have a metal gradient within the same catalyst sample. In other words, metal loading can be lower at the inlet side and the loading can gradually be increased toward the outlet side of the sample.

EXAMPLES

Depend on the control strategy on the air/fuel ratios, the exhaust gas composition coming from the automobile, small utility or diesel truck engines are different from each other. But normally the exhaust gas comprises approximately 14% steam, 10% $CO_2$, <5% $O_2$, <3% CO, <1% $NO_x$, unburned hydrocarbons and balance $N_2$. Therefore, to produce $H_2$ and CO by the CPO reactions of the fuels and the recycled exhaust gas, it maybe necessary to inject additional amount of $O_2$ into the EGR Oxidizer to increase the $O_2$/C ratio. For example, a simple "reed" valve, a carburetor, or a gas flow controller can be installed in the exhaust pipe for this purpose.

As described previously, catalytic partial oxidations of HC and bio-fuels over the Pt group metal catalysts has been studied over the years by several laboratories, and $H_2$ and CO can successfully be produced at very high space velocities from fuels such as #2 diesel oil, gasoline, natural gas, LPG, jet fuel, ethanol, sugar-water, other bio-fuels etc. Therefore, it is not necessary to repeat these experiments here. Instead, the experiments in the following examples are to demonstrate that an apparatus equipped with an EGR Oxidizer can initiate the catalytic partial oxidation reactions with the re-circulated hot exhaust gas without using any external heating devices, and that this Oxidizer can successfully be used to convert and to pretreat various fuel mixture for the IC engine/gas turbines, especially when a low light-off chemical compound such as alcohols, olefin etc is added to a fuel mixture to initiate and to provide heat to improve the CPO reactions of higher molecular weight fuels such as bio-diesel, vegetable oils, sugar water etc.

Experimental Setup and Test Procedures

A commercial Honda lawn mower (Model HR 215) equipped with a 5 HP 4-stroke engine was modified according to FIG. 1. An EGR Oxidizer and the exhaust recycled gas lines were installed into the system, but an electric generator and a catalytic converter were not installed. As shown in FIG. 1, air flow and the fuel flow from tank 1 were controlled and injected into the engine by the original carburetor, and the flow rate of fuel in tank 12 was controlled by a metering pump (Model "QV—#RHOCKC", by Fluid Metering, Inc.). Briefly, this metering pump could precisely deliver the desired amount of fuel/water/alcohol mixture from tank 12 directly into the recycled exhaust gas and the EGR Oxidizer without going through the heat exchanger 8. There were two ceramic monolithic catalyst samples loaded inside the Oxidizer, and the two catalyst samples used here contained about 80 g/ft$^3$ of Pt—Pd—Rh metals (2/1/1 wt % ratio).

At the beginning of the experiment, the lawn mower was run for 10 minutes in "full speed" mode using gasoline fuel in tank 1, and the engine's total exhaust gas would flow through the Oxidizer to increase the catalyst temperature quickly. In the following experiments, the Oxidizer's outlet gas was not connected to the engine's intake and it was vented directly to the atmosphere.

After 10 minutes of operation, fuel 2 in tank 12 was admitted into the Oxidizer (but without going through the heat exchanger 8) by starting the metering pump to deliver and inject the desired amount of fuel mixture into the recycled exhaust gas, and the two exhaust valves (3A) were adjusted to regulate the $O_2$/C ratio by delivering only portion of the exhaust flow to the Oxidizer. Once the CPO reactions were started, the outlet temperature should be higher than the inlet temperature of the Oxidizer. Therefore, by simply measuring the inlet and outlet temperatures of the Oxidizer, the CPO reactions at a proper $O_2$/C ratio could be assured, and $H_2$ and CO should be produced from fuel 2.

For the experiments described in Table 1, the hot EGR recycled gas could initiate the CPO reactions from various fuels without using any additional heating devices or heat exchanger. However, for natural gas and other more stable fuels, the oxidation reactions will not occur until the reactor's temperature is >300° C. Under this condition, proper amount of chemical compound such as alcohols, olefins or unsaturated HC, which is a low temperature light-off compound, can be added to the fuel line or to the fuel tank 12 for the purpose of initiating the reactions and raising the reactor temperature >300° C. If necessary, any external heating devices such as hot wire heater, glow plug, electrical heated catalyst or heat exchanger can also be used.

To obtain single-phase fuel mixture in tank 12 (FIG. 1) comprising hydrocarbons, alcohols, vegetable oil, animal fats, water, sugar, surfactants etc, it is necessary to observe the mutual solubility among the compounds in the mixture. In other words, there are certain limits on the % of each compound that can be mixed with each other without forming separate phases.

Experimental Results

The experimental results are shown in Table 1. For Run #1 in Table 1, Shell Oil's regular gasoline purchased from a local gas station was used as the primary and secondary fuel in both tank 1 and 12. It was found that, with the engine at the full speed mode (the Honda lawn mower is equipped with three speed modes—"choke", "full" and "idle") and with the entire engine's exhaust gas passing through the Oxidizer, the inlet Oxidizer's temperature could easily reach >250° C. in less than 1 minute. After 10 minute of operation, the secondary fuel in tank 12 as shown FIG. 1 was admitted at 1.5 CC/min into the Oxidizer by turning on the metering pump, and the $O_2/C$ ratio was adjusted by regulating the by-pass valves 3A (FIG. 1) to inject only portion of engine's exhaust gas passing through the Oxidizer. As shown in Table 1, the inlet and outlet Oxidizer's temperatures without the secondary fuel injection were 333 and 276° C. respectively. With the secondary fuel injection, they were 248 and 452° C. respectively after 10 minute, and at 258 and 458° C. respectively after 20 minute. The results of Run #1 indicated that the catalytic partial oxidization of gasoline could be initiated with the recycled hot exhaust gas without using any external heating devices, and that stable oxidation reactions could be reached for this engine equipped with an EGR Oxidizer.

The above experiment was repeated and the results of Run #1 could be reproduced in a different day, as shown by Run #2 in Table 1.

In Run #3, the engine was run at the full speed mode using gasoline as the primary fuel and with all the exhaust gas passing through the Oxidizer, the inlet and outlet temperatures after 10 minutes were found at 316 and 254° C. respectively. After 10 minutes, a commercial methanol purchased from a local auto part store (>99% purity Superclean Brand, Inc.) was used to replace the gasoline as the secondary fuel in tank 12 (gasoline is still the primary fuel in tank 1), and the inlet and the outlet temperatures after 10 minutes were found to be at 241 and 341° C. respectively. Note that the methanol fuel has lower enthalpy than a commercial regular gasoline fuel. Therefore, under the similar experimental conditions, the oxidation reactions of methanol should produce less amount of heat and the outlet temperature is expected to be lower as shown in Table 1.

In Run #4, a fuel mixture consisting of 400 CC regular gasolines, 200 CC corn oil and 100 CC methanols was used as the secondary fuel in tank 12. Using the same experimental procedures, it was found that the inlet and outlet temperatures were found to be at 313 and 223° C. respectively before the secondary fuel injection, and they were 248 and 461° C. after the injection. Again, it can be concluded that this fuel mixture could be reacted inside this Oxidizer containing Pt group metal catalyst without any external heating devices when at least one low temperature light-off chemical compounds was present in the fuel mixture, and that the fuel mixture containing corn oil can be used here.

TABLE 1

Experimental Results of the EGR Oxidizer Tests

| Run Number | Primary Fuel | Lawn Mower Operating Mode | Room | Temperature (C.) $T_{10,in}$ | $T_{10,out}$ | Secondary Fuel | Temperature (C.) $T_{10,In}$ | $T_{10,out}$ | Temperature (C.) $T_{20,in}$ | $T_{20,out}$ | Comment |
|---|---|---|---|---|---|---|---|---|---|---|---|
| 1 | Gasoline | Full | 20 | 333 | 276 | Gasoline | 248 | 452 | 258 | 458 | fuel pump @ 150 |
| 2 | Gasoline | Full | 11 | 355 | 287 | Gasoline | 281 | 463 | | | fuel pump @ 150 |
| 3 | Gasoline | Full | 12 | 316 | 254 | methanol | 241 | 341 | | | fuel pump @ 200 |
| 4 | Gasoline | Full | 14 | 313 | 223 | Mixed fuels | 248 | 461 | | | fuel pump @ 150 |
| | | | | | | (Mixed fuels contains 400 CC gasoline + 200 CC corn oil + 100 CC methanol) | | | | | |

(1). $T_{10,in}$ & $T_{20,in}$ - EGR inlet temperatures after respectively 10 & 20 minutes of operation.
(2). $T_{10,out}$ & $T_{20,out}$ - EGR outlet temperatures after respectively 10 & 20 minutes of operation.
(3) After 10 minutes of operation, secondary fuel is injected in front of the catalytic EGR oxidizer. Only portion of the exhaust gas was recycled back to the EGR Oxidizer.

I claim:

1. A process of generating hydrogen and CO from fuels for assisting the fuel combustion inside an engine/gas turbine using an on-board Exhaust Gas Recycle (EGR) oxidizer, comprising the steps of:
a) introducing a stream of a fuel mixture through an inlet in one end of an EGR oxidizer,
  i) said a fuel mixture comprising fuels, steam, air and portion of engine/gas turbine exhaust gas re-circulated through an exhaust gas recirculation line, and said fuel mixture having a $H_2O/C$ ratio between 0.50 and 10.0, an $O_2/C$ ratio between 0.15 and 1.5 and a $CO_2/C$ ratio between 0.00 and 0.5;
  ii) said EGR oxidizer comprising two reaction zones and each reaction zone containing one or more supported or unsupported Pt group metal catalysts for the production of $H_2$ and CO from said fuel mixture; and
  iii) said exhaust gas recirculated through the recirculation line providing heat, $O_2$, steam and $CO_2$ to said first reaction zone within said EGR oxidizer,
b) reacting first said fuel mixture over said Pt group metal catalysts within said first reaction zone of the EGR oxidizer by a reforming process at a temperature between 150-1200° C. with pressure between 1 to 10 atmosphere to convert up to 100% of said fuels and to produce a reformate comprising steam, $H_2$, CO, $CO_2$, $N_2$, and unconverted fuels,
c) reacting further said reformate from the first reaction zone over said catalysts in the second reaction zone of the EGR oxidizer at a temperature between 100-500° C. to produce extra $H_2$ from CO and steam by water gas shift reaction, and d) discharging the reformate from the second reaction zone through an outlet in the other end of the EGR oxidizer to a downstream engine/gas turbine either to complete the combustion of said fuels inside the downstream engine/gas turbine, or to use the reformate directly to regenerate the diesel particulate filters, $NO_x$ traps and pollution traps.

2. The process of claim 1, wherein said reforming process is to convert said fuels into $H_2$ and CO over said catalysts either by catalytic partial oxidation reactions or by autothermal reforming reactions, which are the combination of performing simultaneously both catalytic partial oxidation reactions and steam reforming reactions of said fuels over said catalysts.

3. The process of claim 1, wherein the $H_2O/C$, $CO_2/C$ and $O_2/C$ ratios of the EGR oxidizer's inlet fuel mixture are adjusted individually or simultaneously to efficiently convert said fuels in said EGR oxidizer without coke formation and to constantly keep the maximum reactor temperature below 1200° C.

4. The process of claim 1, wherein the $O_2/C$ ratio of the EGR oxidizer's inlet gas mixture is controlled to: (a) obtain a value between 10% and 80% of the stoichiometric $O_2/C$ ratio for the complete combustion reactions of the fuels, (b) perform up to 100% conversion of said fuels by performing catalytic partial oxidation reactions to produce a reformate containing $H_2$, CO and unconverted fuels, and (c) discharge the reformate from the EGR oxidizer to a downstream engine/gas turbine and combust completely the unconverted fuels, $H_2$ and CO with an additional controlled amount of air inside the downstream engine/gas turbine.

5. The process of claim 1, wherein the $O_2/C$ ratio of the EGR oxidizer's inlet gas mixture is adjusted to achieve approximately 100% fuel conversion by performing the catalytic partial oxidation reactions and to produce a reducing gas containing $H_2$ and CO for regeneration of a $NO_x$ trap or a diesel particulate filter.

6. The process of claim 1, wherein said stream of fuel mixture is contacted with said catalysts inside the EGR oxidizer's two reaction zones and the residence time is less than 300 milliseconds.

7. The process of claim 1, wherein the Pt group metal catalysts are selected from the group consisting of platinum, palladium, rhodium, iridium, osmium, ruthenium and mixtures thereof.

8. The process of claim 1, wherein said stream of fuel mixture is vaporized and is converted over the Pt metal catalysts to produce CO and $H_2$ without coke formation, and said stream of fuel mixture comprising one or more fuels selected from the group consisting of hydrocarbons, natural gas, sugar, glucose, animal fats, alcohols, vegetable oils, soybean oil, corn oil, olive oil, jatropha oil, bio-ethanol, bio-diesel, biobutanol, bio-methane, bio-fuels derived from biomass, bio-fuels derived from agriculture/industrial/animal wastes and an industrial exhaust gas containing volatile organic compounds.

9. The process of claim 1, wherein said stream of fuel mixture comprising one or more fuels selected from the group consisting of methane, biogas, natural gas, LPG, ethanol, bio-ethanol, biobutanol, methanol, propanol, acetone, gasoline, diesel, bio-diesel, jet fuel and mixtures thereof.

10. The process of claim 1, wherein water is injected or sprayed into the outlet of said EGR oxidizer to reduce the reformate temperature before the reformate is injected into a downstream engine or gas turbine.

11. The process of claim 1, wherein said EGR oxidizer and the engine/gas turbine system are connected to an electric generator and a battery bank/grid to generate, transmit and store electricity.

12. The process of claim 1, wherein said EGR oxidizer is integrated into an engine/gas turbine as part of a single unit and an additional controlled amount of air is injected directly into the engine/gas turbine to achieve complete combustion of said fuels inside the engine/gas turbine.

13. The process of claim 1, wherein said EGR oxidizer is connected internally or externally to an engine or a gas turbine and is used as an on-board reformer to produce $H_2$ and CO from said fuels.

14. The process of claim 1, wherein a ceramic or a metallic heat exchanger or a cross flow device is connected to an engine/gas turbine's exhaust line, and one side of the heat exchanger is coated with the EGR oxidizer's Pt group metal catalysts to produce $H_2$ and CO from said fuels.

15. The process of claim 1, wherein one or more external heating devices located at the inlet side of said oxidizer is selected from the group consisting of electric hot wire, glow plug, heat exchanger, spark plug, plasma heating device and an electrically heated metal catalyst.

16. The process of claim 1, wherein said fuels in said stream of fuel mixture comprising two or more fuels which are selected from the group consisting of liquid hydrocarbons, bio-fuels, vegetable oils, sugar, alcohols and surfactants are blended together to form a single phase aqueous mixture.

17. The process of claim 1, wherein thermocouples or temperature sensing elements are used as feedback controllers for the purposes of regulating the $O_2/C$ ratio, controlling the % fuel conversion and improving the performance of said EGR oxidizer.

18. The process of claim 1, wherein said EGR oxidizer is providing a reducing gas containing $H_2$ and CO to regenerate a $NO_x$ trap or a diesel particulate filter for an engine, truck, gas turbine, furnace, boiler, or combustors in power plants.

19. The process of claim 1, wherein a system comprising an EGR oxidizer and an engine/gas turbine is used directly as a driving device for a lawn mower, chainsaw, weed eater, motorcycle, automobile, bus, truck and train.

20. The process of claim 1, wherein two or more of said EGR oxidizers are arranged in parallel to each other and simultaneously provide each said reformate for a single engine/gas turbine.

21. The process of claim 1, wherein a single said EGR oxidizer provides the reformate simultaneously for several parallel engines/gas turbines.

22. The process of claim 1, wherein said EGR oxidizer, an engine/gas turbine/steam turbine, an electricity generator and a battery bank are connected together to form an integrated electric generating system.

23. The process of claim 22, wherein the integrated electric generating system is used as a distributed stationary or mobile power generator to provide electricity for an electric car, truck, bus, motorcycle, lawn mower, forklift truck, weed eater, train, lighting devices and battery charger.

24. The process of claim 1, wherein the unsupported Pt group metal catalysts in the reaction zones are present in the shape of gauge, screen, wire mesh, thin film, foil or foam.

25. The process of claim 1, wherein the supported Pt group metal catalysts in the first reaction zones are present in the form of washcoats comprising support oxides which are impregnated with the Pt group metal catalysts.

26. The process of claim 25, wherein the catalyzed washcoats are coated on various inert ceramic or metallic substrates.

27. The process of claim 25, wherein the support oxides are one or more oxides selected from the group consisting of $Al_2O_3$, cerium-zirconium oxide, cerium-zirconium oxide composite, oxides of copper, vanadium, cobalt, nickel, iron, rhenium, cerium and zirconium and mixtures thereof.

28. The process of claim 27, wherein the support oxides are further impregnated and/or mixed with one or more additional oxides of a metal selected from the group consisting of lanthanum, praseodymium, yttrium, potassium, zinc, calcium, barium, strontium, magnesium and mixtures thereof.

29. The Process of claim 25, wherein the Pt group metals in the washcoats are present in an amount of 0.01 to 10 weight % of the oxides.

30. The process of claim 26, wherein said inert ceramic substrate is selected from the group consisting of alumina, alumina-silica, alumina-silica-titania, mullite, cordierite, zirconia, zirconia-ceria, zirconia-spinel, zirconia-mullite and silicon carbide, and the substrate is in the shape of monolith, pellet, bead, foam, plate, and static mixer.

31. The process of claim 26, wherein said metallic substrate sustains a temperature between 500 and 1100° C. and is in the shape of monolith, screen, mesh wire, foil, foam, static mixture, plate or heat exchanger.

32. The process of claim 1 wherein said fuels in the fuel mixture comprising one or more chemical compounds selected from the group consisting of methanol, ethanol, propanol, acetone, and unsaturated olefins, are used to initiate the partial oxidation reactions over the Pt group metal catalysts in the first reaction zone at a temperature below 250° C.

33. The process of claim 1, wherein said second reaction zone of said EGR oxidizer comprising a water gas shift catalyst which is used to promote the reaction between steam and CO in the reformate to produce extra $H_2$ at a temperature between 100-500° C., and the $H_2$ is used for performing the regeneration and/or reduction of a diesel particulate filter, Pt group metal catalysts, or a $NO_x$ trap.

34. The process of claim 33, wherein said water gas shift catalyst is selected from the group consisting of Pt, Pd, Ru, Ni, Cu, Ag, Au, Fe, Co and Rh.

35. The process of claim 34 wherein said water gas shift catalyst is impregnated and/or mixed with one or more support oxides selected from the group consisting of $Al_2O_3$, $SiO_2$, MgO, zeolite, CuO, ZnO, $CeO_2$, Ce—Zr oxide and Ce—Zr oxide composite.

36. The process of claim 35, wherein the water gas shift catalyst is impregnated and/or mixed with one or more additional oxides of a metal selected from the group consisting of oxides of La, Y, Pr, K, Ca, Re, Zn, Zr, Tin, Nd, Ba and Sr.

37. The process of claim 36, wherein said water gas shift catalyst is selected from the group consisting of Cu—Zn oxide, Cu—Zn—$Al_2O_3$, and Fe/Cr oxide.

* * * * *